(12) United States Patent
Freeman (10) Patent No.: US 9,140,448 B2
(45) Date of Patent: Sep. 22, 2015

(54) VIBRATORY FEED MECHANISM FOR PELLET FUEL COMBUSTION DEVICE

(76) Inventor: Mark D. Freeman, Hayden, ID (US)

( * ) Notice: Subject to any disclaimer, the term of this patent is extended or adjusted under 35 U.S.C. 154(b) by 251 days.

(21) Appl. No.: 13/492,068

(22) Filed: Jun. 8, 2012

(65) Prior Publication Data

US 2013/0327259 A1    Dec. 12, 2013

(51) Int. Cl.
*A47J 37/00* (2006.01)
*F23B 50/12* (2006.01)
*F23K 3/16* (2006.01)
*A47J 37/07* (2006.01)

(52) U.S. Cl.
CPC . *F23B 50/12* (2013.01); *F23K 3/16* (2013.01); *A47J 37/0704* (2013.01)

(58) Field of Classification Search
CPC .................................................. A47J 37/0704
USPC ....... 110/109, 113; 126/25 R, 1 R–1 F, 58–98
See application file for complete search history.

(56) References Cited

U.S. PATENT DOCUMENTS

| 3,938,451 A | 2/1976 | Lucas, Jr. | |
| 4,744,311 A * | 5/1988 | Piekos | 110/108 |
| 4,954,034 A | 9/1990 | Nelson et al. | |
| 5,151,000 A | 9/1992 | Geraghty et al. | |
| 5,429,110 A * | 7/1995 | Burke et al. | 126/25 R |
| 5,558,691 A | 9/1996 | Horn et al. | |
| 7,621,227 B2 | 11/2009 | Sterr | |
| 2004/0226550 A1* | 11/2004 | Hutton et al. | 126/25 R |
| 2011/0073101 A1* | 3/2011 | Lau et al. | 126/501 |

* cited by examiner

*Primary Examiner* — Kenneth Rinehart
*Assistant Examiner* — Gajanan M Prabhu
(74) *Attorney, Agent, or Firm* — Randall | Danskin, PS (57) ABSTRACT

A vibratory feed mechanism for pellet fuel combustion device provides a spring-mounted feed plate communicating with a fuel reservoir and vibrated by an electric motor carrying an offset counterweight to move pelletized fuel from a first position on the feed plate to a feed orifice defined in the feed plate for communication of the pelletized fuel to a metering channel and a drop tube for conveyance to a fire pot. A control board communicating with an igniter, at least one thermocouple, a combustion fan, and the electric motor allow a user to set a desired parameter which controls the rate of pelletized fuel feed and temperature and operating conditions.

2 Claims, 12 Drawing Sheets

VIBRATORY FEED MECHANISM FOR PELLET FUEL COMBUSTION DEVICE

RELATED APPLICATIONS

There are no patent applications related hereto previously filed in the United States or in any foreign country.

BACKGROUND OF INVENTION

1. Field of Invention

This invention relates to combustion devices, and more particularly to a pellet fuel feed mechanism, and even more particularly to a vibratory feed mechanism for moving pelletized fuel from a fuel reservoir to a fire pot in a combustion device for generating heat.

2. Background and Description of Prior Art

For centuries wood has been burned in pits, fireplaces, stoves, and barbeques to provide heat. Over time, the methods and apparatus in which wood was burned to provide heat improved. For instance, pits led to hearths. Hearths led to stoves. Stoves led to furnaces and registers. Many of these improvements followed or resulted from advances in science, advancements in manufacturing, and also the availability of resources.

Similar to changes and advancements in the apparatus used to generate heat, advancements also followed for fuels used with those apparatus' for generating heat with the goal of providing more heart per unit of fuel, lower cost, easier storage, reduced risk of undesirable fires and reduced waste products such as smoke, ash, and soot.

Various of these advancements led to the development of pellet fuel stoves and pelletized fuel. One of the many reasons pellet fuel stoves have become popular is because pelletized fuel can be manufactured from products that would otherwise be waste products, such as sawdust, wood bark, rice hulls, walnut shells and the like. As such, pelletized fuel has remained relatively inexpensive as compared to wood, oil, coal or natural gas. Further pelletized fuel is easy to store and does not readily burn without forced air and therefore presents a reduced fire risk.

Unfortunately, known pellet fuel combustion devices, including but not limited to pellet fuel stoves and pellet fuel barbeques suffer from a universal problem that is inherent in known pellet fuel feed mechanisms by which the pelletized fuel is moved from a fuel reservoir, to a fire pot where the fuel is combusted to generate heat.

In known pellet fuel combustion devices, a rotating feed auger is used to move the pelletized fuel from the fuel reservoir to a drop chute where the pelletized fuel moves under the force of gravity, downwardly to the fire pot where combustion takes place. The feed auger is commonly powered by an electric motor and a reduction gear assembly that rotates the auger responsive to a signal received from a control panel and a thermocouple. The feed auger is commonly carried within an auger tube having a first end portion and second end portion. The fuel reservoir communicates with the first end portion of the auger tube so that the pelletized fuel is deposited into the auger tube at the first end portion and rotation of the auger moves the pelletized fuel from the first end portion to the second end portion that communicates with the drop tube. For safety reasons, the second end portion of the drop tube is vertically and horizontally spaced apart from the fire pot to prevent a "burn back" where pellet fuel within the auger tube might catch fire and "burn back" to the fuel reservoir.

Over the periods of use, the feed auger will start and stop many thousands of times responsive to receiving a signal from the control board and the thermocouple to move additional fuel pellets from the fuel reservoir to the drop tube to feed the fire pot to maintain a desired level of heat. The starting and stopping of the auger motor, the reduction gear assembly and the auger causes wear to the various mechanical components and frequently leads to the mechanical parts being noisy. Further, because the fuel pellets have "rough" surfaces that enhance the tendency to "catch" fire, the fuel pellets also have the tendency to "wear on" and "abrade" the surfaces of the auger tube and the auger, which after periods of use may cause "gaps" and "spaces" between edge portions of the auger and the auger tube where fuel pellets may become "caught" and "trapped" causing binding such that the auger may not spin freely within the auger tube. Such binding exacerbates the wear on the auger, the auger tube, the reduction gears and the auger motor.

It is well known in the pellet stove industry that the primary cause of breakdown and dysfunction of pellet fuel combustion devices is malfunction and wearing out of the auger, the auger motor and the auger reduction gear assembly which may collectively be referred to as the "feed mechanism." Further, one of the primary complaints of pellet fuel combustion devices is the noise generated by the starting and stopping of the feed mechanism.

Because pellet fuel combustion devices require regular periodic feeding of fuel pellets to operate, when the auger, the auger motor, or the reduction gear assembly malfunction, the pellet fuel combustion device is inoperable, will not generate heat, which may in some instances, lead to significant damage to the user's premises, such as frozen pipes, and the like.

What is needed is a feed mechanism for pellet fuel combustion devices that does not suffer from the same drawbacks as auger feed mechanisms. What is needed is a pellet fuel feed mechanism that eliminates the mechanical interconnection of an auger motor, a reduction gear assembly and an auger that rotates axially within an auger tube. Elimination of the mechanical interconnection of these various components significantly reduces the likelihood of failure, the amount of wear-and-tear subjected upon the components, and also eliminates the noise generated by the mechanically interconnected moving parts.

My vibratory feed mechanism for pellet fuel combustion devices overcomes various of the aforementioned drawbacks by providing a spring supported feed plate that is vibrated by an electric motor carrying an offset counterweight. The spinning of the counterweight by the vibration motor causes the feed plate to vibrate which responsively causes fuel pellets to move along an upper surface of the feed plate from a fuel reservoir to a metering channel and a drop tube for conveyance of the fuel pellets to a fire pot. The spring mounting of the feed plate dampens noise and eliminates transfer of the vibration to the stove. The absence of an auger, an auger motor and a reduction gear assembly reduces wear and tear, reduces maintenance and reduces noise.

My vibratory feed mechanism will operate with various forms of pelletized fuel including, but not limited to, fuel pellets formed of wood, wood products, wood by-products, corn, rice hulls, walnut hulls, nut shells and biomass. All of these named fuel types, and others not named, are available, or are contemplated as being available, in pelletized form.

Some or all of the drawbacks and problems explained above, and other drawbacks and problems, may be helped or solved by my invention shown and described herein. My invention may also be used to address other problems not set out herein or which become apparent at a later time. The future may also bring to light unknown benefits which may, in the future, be appreciated from the novel invention shown and described herein.

My invention does not reside in any one of the identified features individually, but rather in the synergistic combination of all of its structures, which give rise to the functions necessarily flowing therefrom as hereinafter specified and claimed.

SUMMARY

A vibratory feed mechanism for pellet fuel combustion device provides a spring-mounted feed plate communicating with a fuel reservoir and vibrated by an electric motor carrying an offset counterweight to move pelletized fuel from the fuel reservoir to a metering channel and a drop tube for conveyance to a fire pot. A control board communicating with an igniter, at least one thermocouple, a combustion fan, and the electric motor allow a user to set a desired parameter which controls the rate of pelletized fuel feed and temperature and operating conditions.

In providing such a vibratory feed mechanism for pellet fuel combustion devices, it is:

a principal object to provide a mechanism that feeds pelletized fuel to a fire pot using vibration.

a further object to provide such a mechanism that moves pelletized fuel from a fuel reservoir to firepot with vibration.

a further object to provide such a mechanism that moves pelletized fuel across a surface of a feed plate with vibration.

a further object to provide such a mechanism that is nearly silent.

a further object to provide such a mechanism that has a feed plate supported on springs.

a further object to provide such a mechanism having a metering channel that vibrates.

a further object to provide such a mechanism that does not have a gear assembly.

a further object to provide such a mechanism that uses a counterweight to generate a vibration.

a further object to provide such a mechanism that is operable with pellet fuel stoves, pellet fuel barbecues and similar pellet fueled combustion devices.

a further object to provide such a mechanism that uses the same motor for a vibration motor and a combustion fan motor.

a further object to provide such a mechanism that will operate as a smoker.

a further object to provide such a mechanism having a control board that allows a user to set a desired temperature.

a further object to provide such a mechanisms having a control board that allows a user to select an operating mode.

a further object to provide such a mechanism that allows a pellet fuel combustion device to operate as both a pellet fuel barbeque and a pellet fuel smoker.

a further object to provide such a mechanism that allows precise measuring of fuel feed to a fire pot.

a further object to provide such a mechanism that is capable of generating high heat and little smoke as well as low heat and large amounts of smoke.

a further object to provide such a mechanism that is operable with various pelletized fuels.

a still further object to provide such a mechanism that allows precise control of heat levels and fuel consumption.

Other and further objects of my invention will appear from the following specification and accompanying drawings which form a part hereof. In carrying out the objects of my invention it is to be understood that its structures and features and steps are susceptible to change in design and arrangement and order with only one preferred and practical embodiment of the best known mode being illustrated in the accompanying drawings and specified as is required.

BRIEF DESCRIPTIONS OF DRAWINGS

Specific forms, configurations, embodiments and/or diagrams relating to and helping to describe preferred versions of my invention are explained and characterized herein, often with reference to the accompanying drawings. The drawings and all features shown therein also serve as part of the disclosure of my invention, whether described in text or merely by graphical disclosure alone. Such drawings are briefly described below.

DESCRIPTION OF PREFERRED EMBODIMENT

The readers of this document should understand that the embodiments described herein may rely on terminology used in any section of this document and other terms readily apparent from the drawings and the language common therefore as may be known in a particular art and known or indicated or provided by dictionaries. Dictionaries were used in the preparation of this document. Widely known and used in the preparation hereof are *Webster's Third New International Dictionary* (©1993), *The Oxford English Dictionary* (Second Edition, ©1989), *The New Century Dictionary* (©2001-2005) and the *American Heritage Dictionary of the English Language* (4$^{th}$ Edition©2000) all of which are hereby incorporated by this reference for interpretation of terms used herein to more adequately or aptly describe various features, aspects and concepts shown or otherwise described herein.

This document is premised upon using one or more terms or features shown in one embodiment that may also apply to or be combined with other embodiments for similar structures, functions, features and aspects of the invention. Wording used in the claims is also descriptive of the invention and the text of both claims and abstract are incorporated by reference into the description entirely. Terminology used with one, some or all embodiments may be used for describing and defining the technology and exclusive rights associated herewith.

The readers of this document should further understand that the embodiments described herein may rely on terminology and features used in any section or embodiment shown in this document and other terms readily apparent from the drawings and language common or proper therefore.

My vibratory feed mechanism for pellet fuel combustion devices provides a vibratory feed assembly 10 having a feed plate 20, a metering channel 29, drop tube 36, a vibration motor 60, a feed plate support 45, a combustion fan motor 70, and a control board 80.

Figure 1:
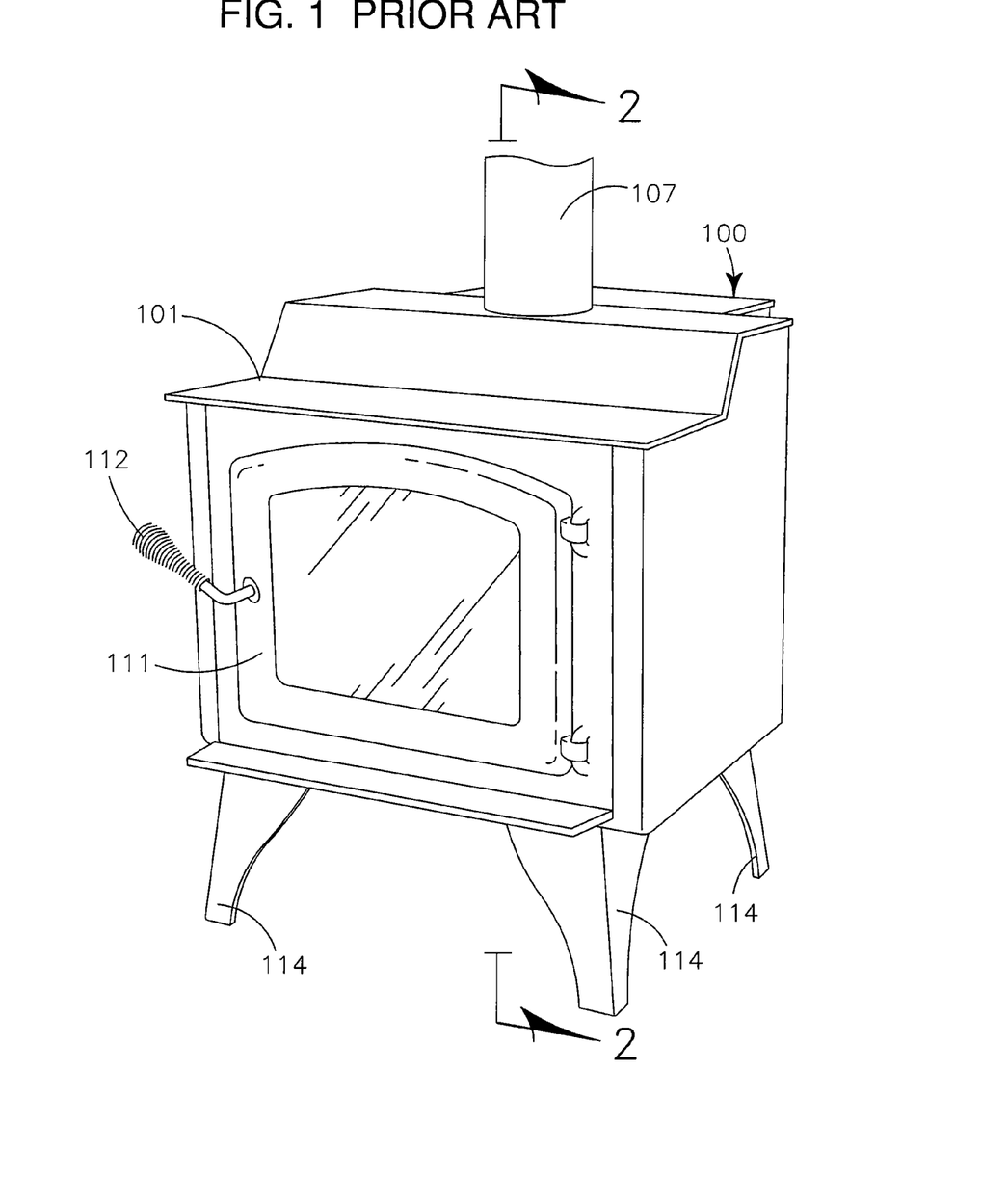
FIG. 1 is a front, side and top view of the exterior of a prior art pellet fuel stove.
Figure 2:
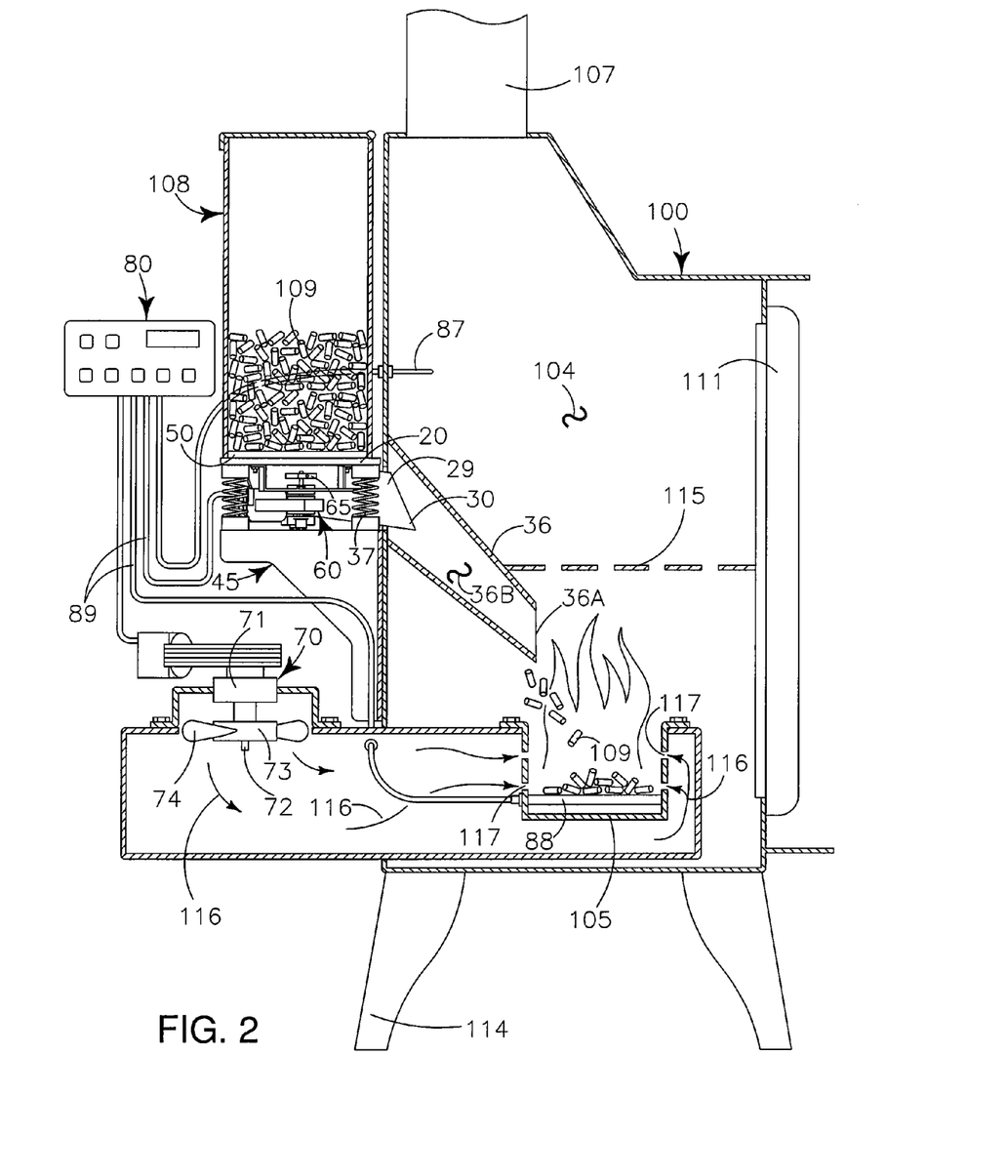
FIG. 2 is orthographic cross-section view of the stove of FIG. 1, taken on line 2-2 of FIG. 1, showing my vibratory pellet fuel feed mechanism feeding fuel pellets to a fire pot.
Figure 11:
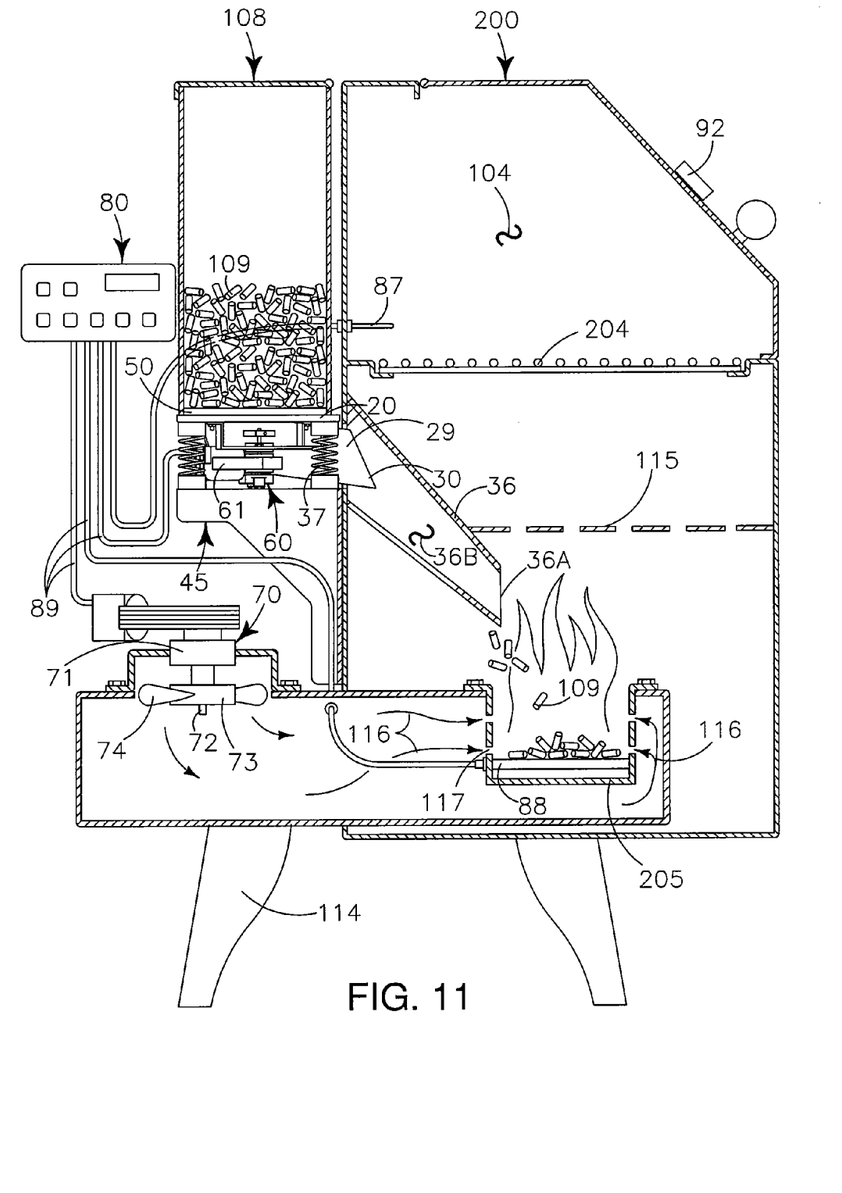
FIG. 11 is an orthographic cross-section view of my vibratory feed mechanism, similar to that of FIG. 2 showing the feed mechanism installed in a pellet burning barbeque.

As shown in FIGS. 2 and 11 my vibratory feed mechanism 10 may be used with both a pellet fuel stove 100 as well as a pellet fuel barbeque 200. For purposes of clarity and simplicity, the description herein shall refer to the use of my vibratory feed mechanism 10 in a pellet fuel stove 100, but readers should understand my feed mechanism is equally usable in pellet fuel barbeques 200, pellet fuel smokers (not shown) and other pellet fuel combustion devices. (not shown).

Figure 12:
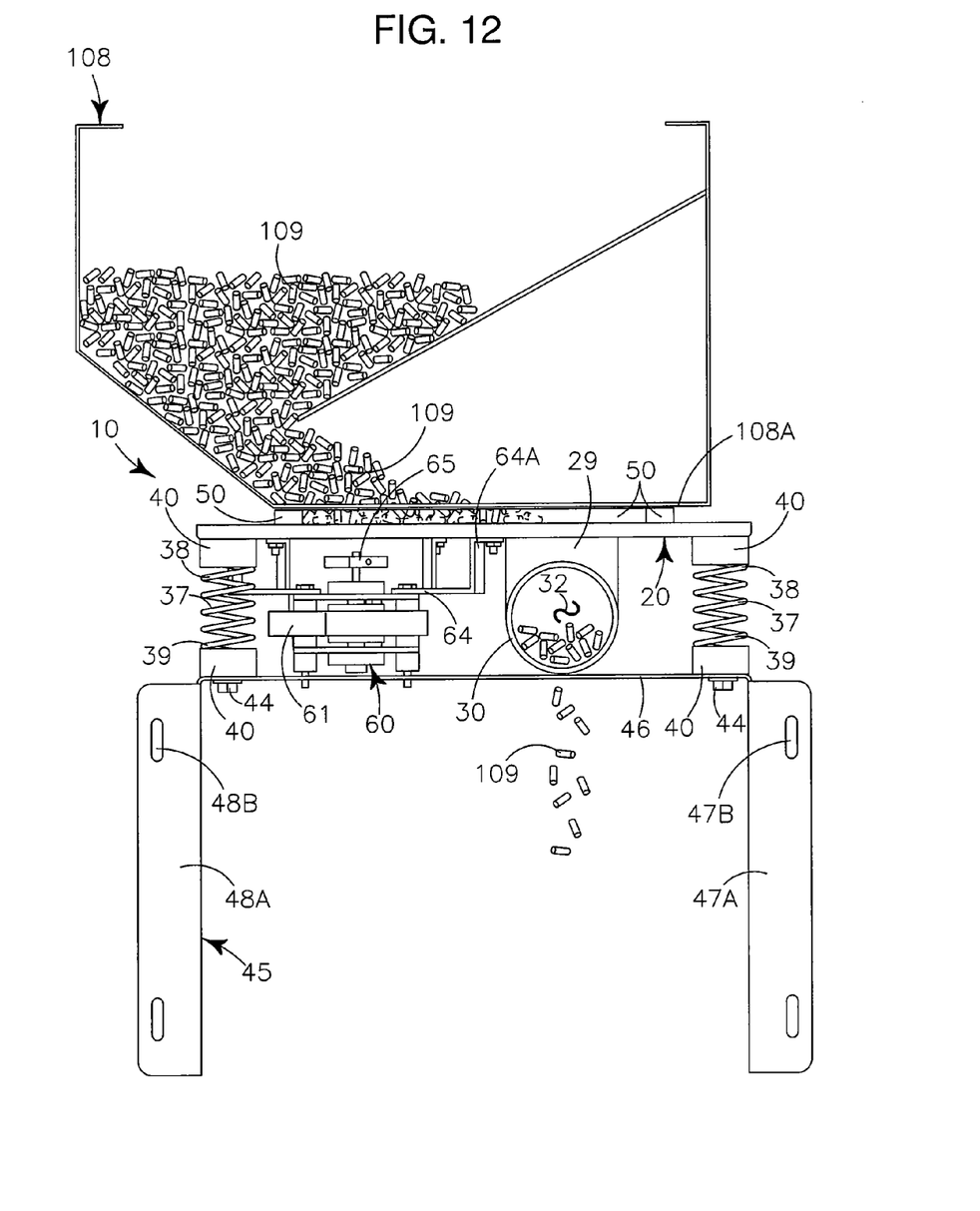
FIG. 12 is an orthographic front view of my vibratory feed mechanism, similar to that of FIG. 4, showing how the vibration moves fuel pellets from the fuel reservoir across the feed plate to the metering channel and to the drop tube.

A fuel reservoir 108, containing a quantity of pelletized fuel 109, is positioned vertically above the feed plate 20 so that a quantity of the fuel pellets 109 rest upon a top portion 22 of the feed plate 20. (FIG. 12.)

Figure 3:
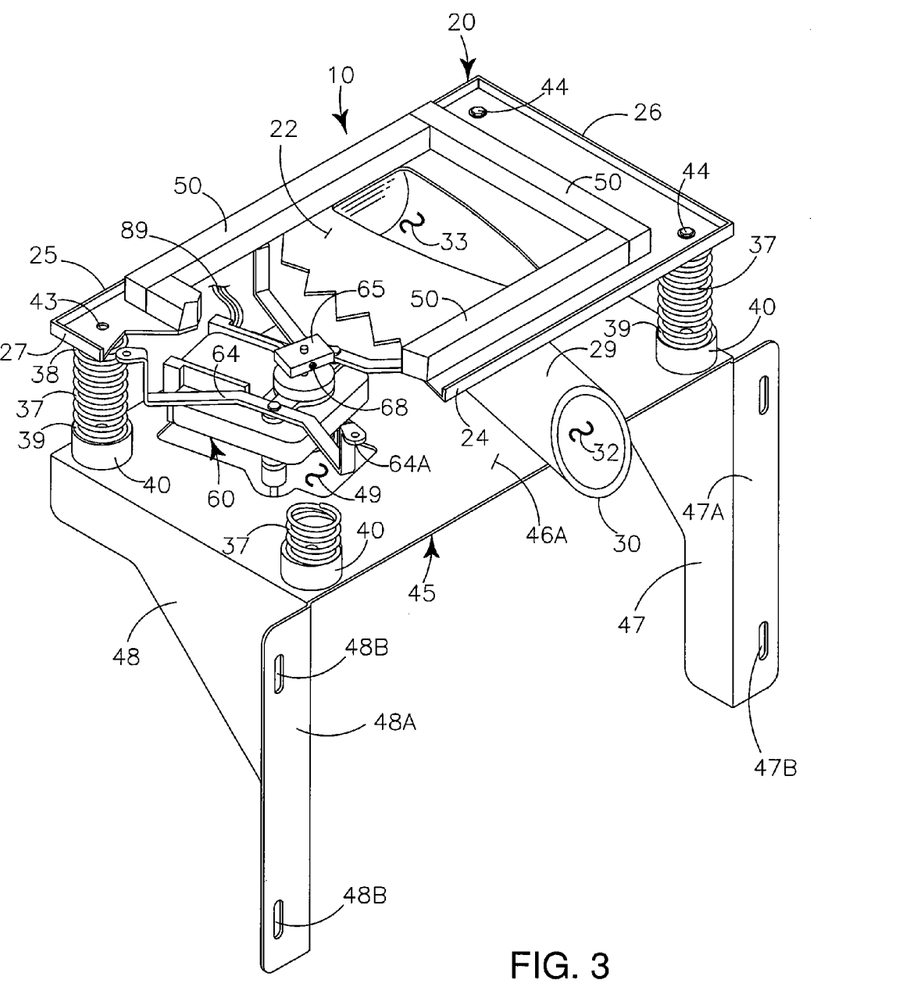
FIG. 3 is an isometric front second side and top view of my vibratory feed mechanism.
Figure 4:
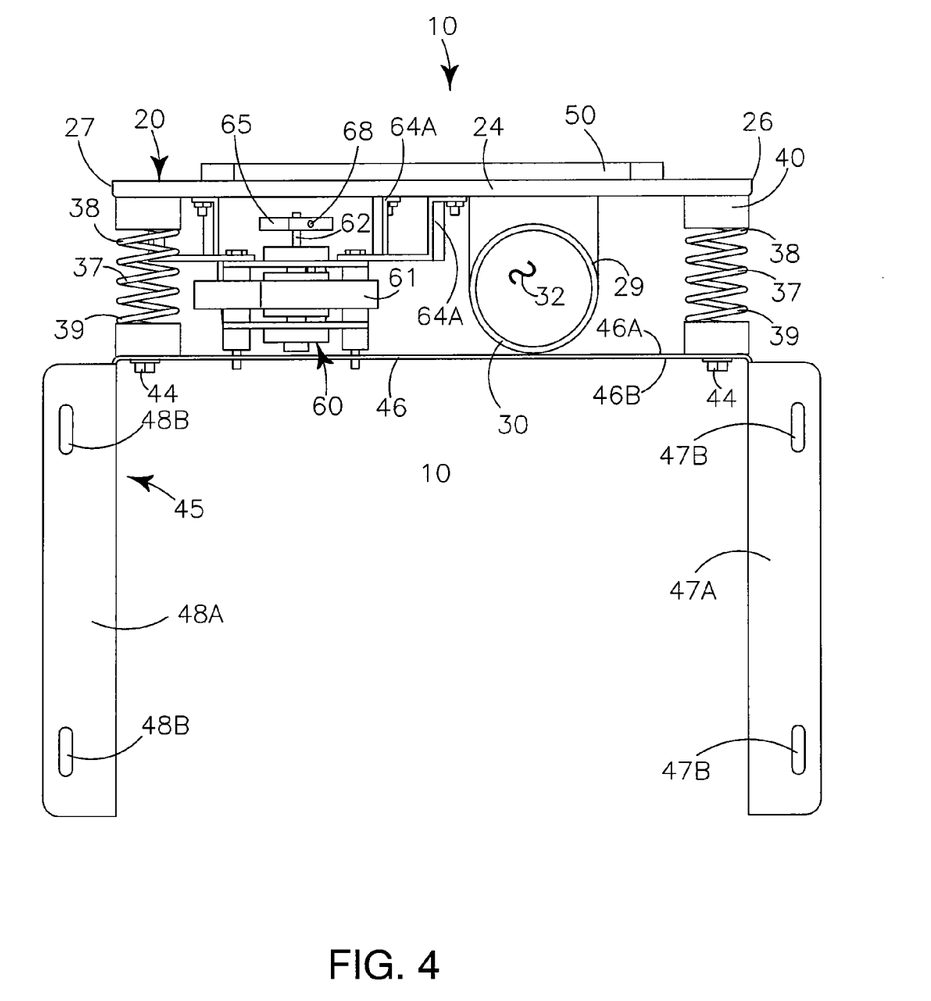
FIG. 4 is an orthographic front view of my vibratory feed mechanism.
Figure 5:
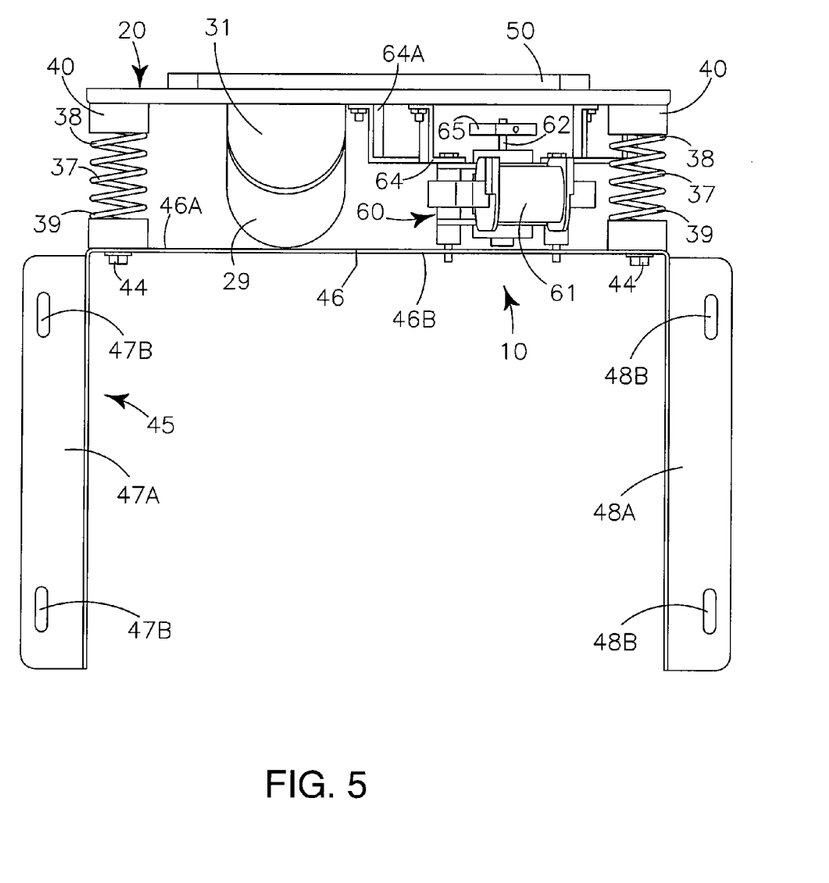
FIG. 5 is an orthographic rear view of my vibratory feed mechanism.

The feed plate 20 has a top portion 22, an opposing bottom portion 23, a front edge 24, a rear edge 25, a first lateral side 26, a second lateral side 27 and defines a feed opening 33 that communicates from the top portion 22 to the bottom portion 23 at a position proximate both the first lateral side 26 and the rear edge 25. (FIG. 3).

A gasket 50, formed of a resilient material that is capable of withstanding high-temperatures such as, but not limited to, Super Resilient Extreme Temperature Silicone Foam Rubber, is carried on the top portion 22 of the feed plate 20 and forms a seal with a bottom portion 108A of the fuel reservoir 108 so that fuel pellets 109 passing from the fuel reservoir 108 are contained on the top surface 22 of the feed plate 20 within a peripheral boundary defined by the gasket 50. In the preferred embodiment, the gasket 50 has an adhesive (not shown) on at least one portion that provides for adhesive attachment to the top portion 22 of the feed plate 20 and/or the bottom portion 108A of the fuel reservoir 108 so that the gasket 50 is positionally maintained thereon. In the preferred embodiment the gasket 50 is positioned in a rectilinear pattern on the top portion 22 of the feed plate 20. The gasket 50 also functions as a dampener to reduce feed plate 20 vibration communicated to the fuel reservoir 108 which might generate noise and dust as the fuel pellets 109 "rub" and/or "bump" against one another within the fuel reservoir 108.

Figure 6:
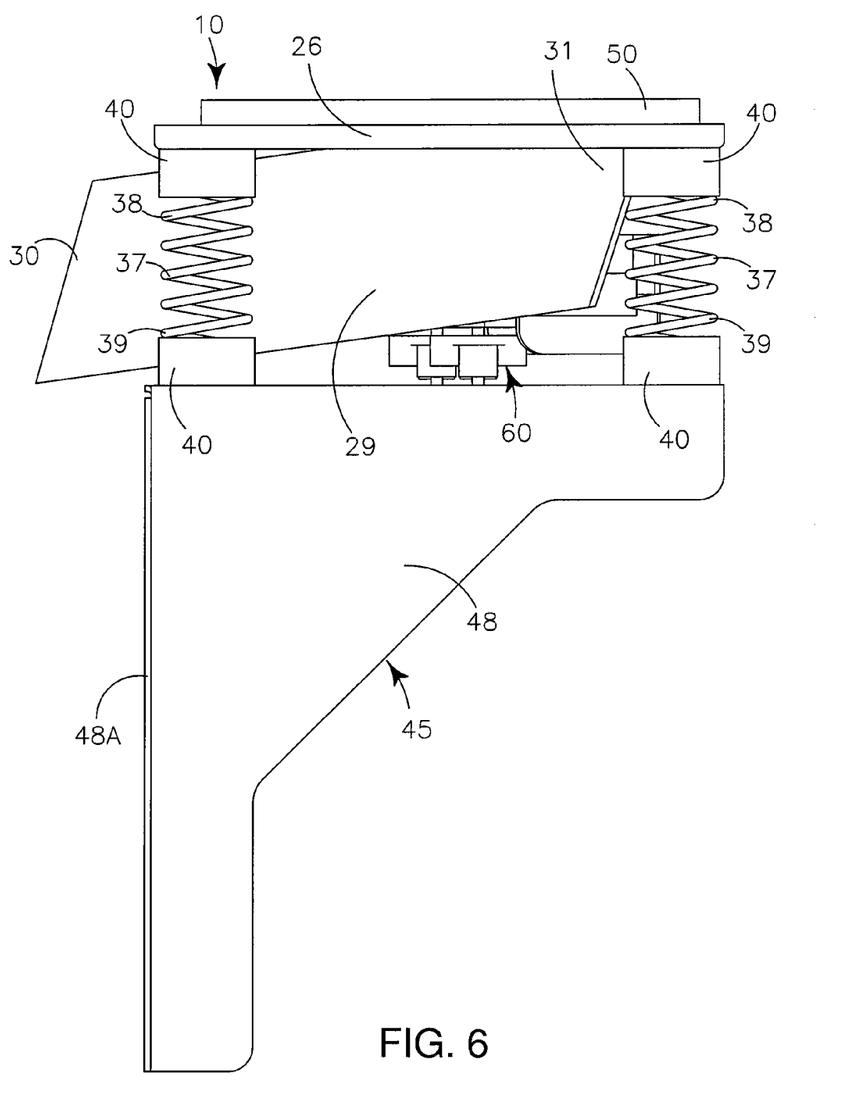
FIG. 6 is an orthographic first side view of my vibratory feed mechanism.
Figure 7:
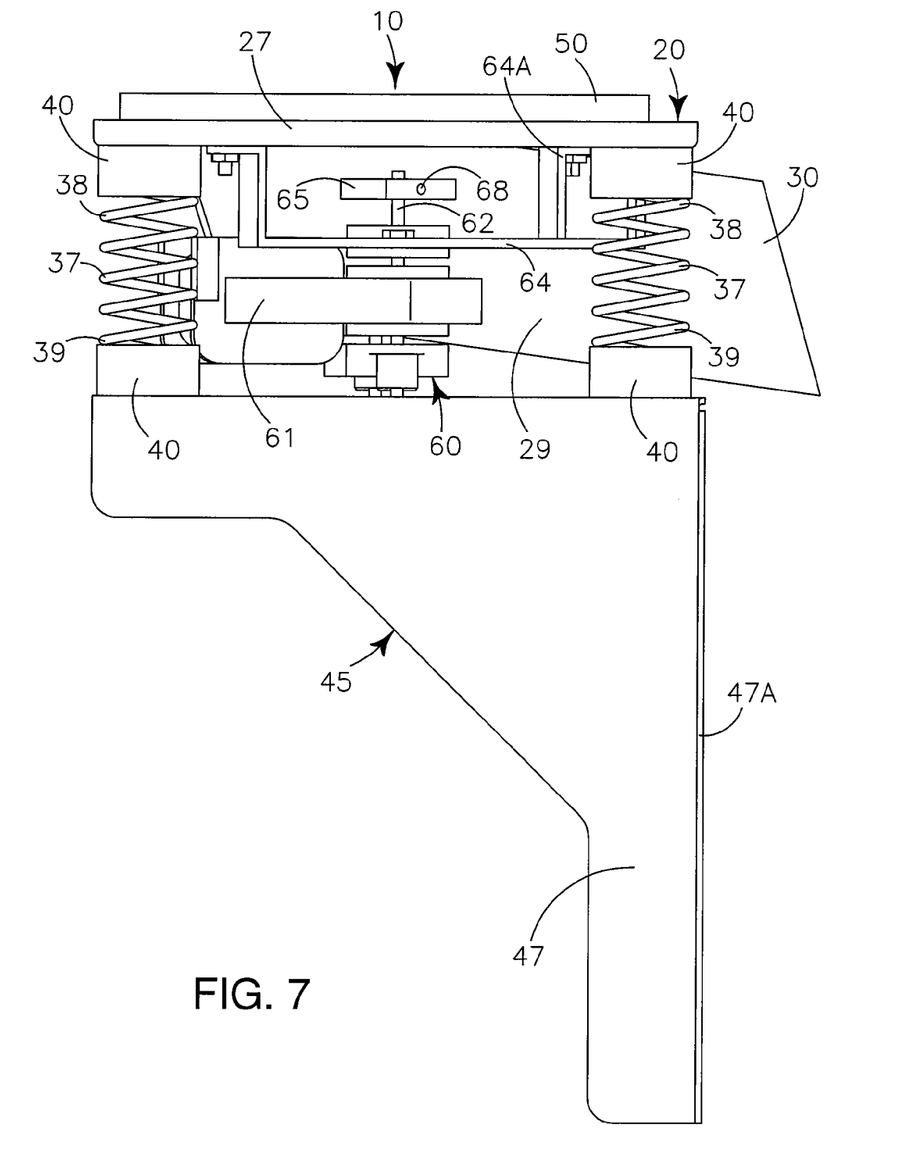
FIG. 7 is an orthographic second side view of my vibratory feed mechanism.
Figure 8:
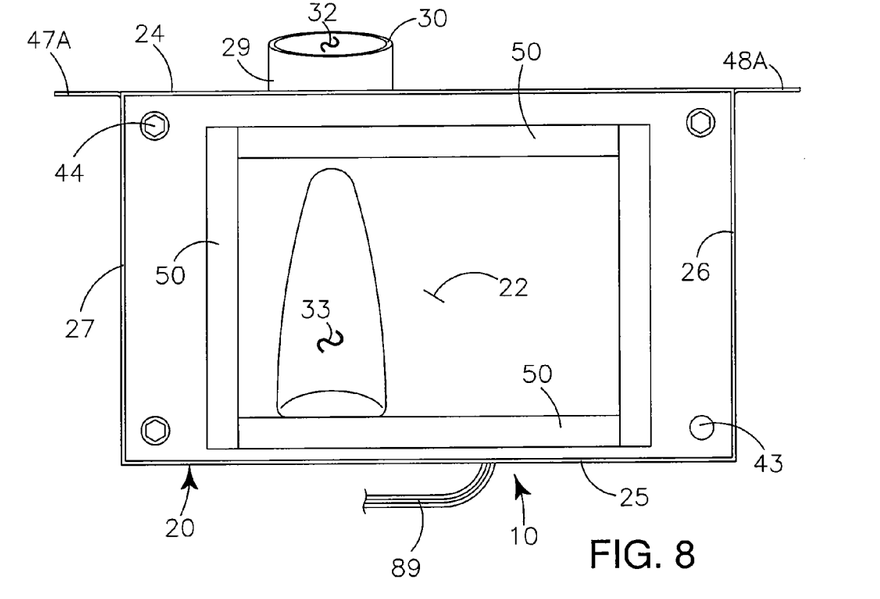
FIG. 8 is a reduced size orthographic top, downward looking view of my vibratory feed mechanism.

The metering channel 29 is generally tubular in configuration defining a medial channel 32 extending therethrough and is structurally carried on the bottom portion 23 of the feed plate 20. The feed opening 33 defined in the feed plate 20 communicates with the medial channel 32 of the metering channel 29 so that fuel pellets 109 passing through the feed opening 33 pass into the medial channel 32. The metering channel 29 has a first end portion 30 proximate the front edge 24 of the feed plate 20 and a second end portion 31 proximate the rear edge 25 of the feed plate 20. As shown in FIGS. 3, 6 and 7, the metering channel 29 is angular relative to the feed plate 20 with the first end portion 30 vertically lower than the second end portion 31 so that fuel pellets 109 entering the medial channel 32 of the metering channel 29 from the feed opening 33, proximate the second end portion 31 move by means of gravity, and by means of vibration, through the medial channel 32 toward the first end portion 30.

As shown in FIGS. 2 and 11, the first end portion 30 of the metering channel 29 does not communicate directly with fire pot 105 where the fuel pellets 109 are combusted. The first end portion 30 of the metering channel 29 is positioned spacedly vertically above and laterally spaced apart from the fire pot 105 to reduce risk of fuel burn-back into the fuel reservoir 108. A downwardly angulated drop tube 36 which defines a medial channel 36B extending therethrough is carried on a firebox wall. The first end portion 30 of the metering channel 29 extends into the medial channel 36B defined by the drop tube 36. Fuel pellets 109 exiting the first end portion 30 of the metering channel 29 fall into the downwardly angulated drop tube 36 and thereafter slide, under the force of gravity downwardly along the length of the drop tube 36 and drop off a lower bottom end portion 36A of the drop tube 36 and fall into the fire pot 105.

The vibration motor 60 has a motor body 61, a rotating shaft 62 and carries a counterweight 65 on the rotation shaft 62. The counterweight 65 is secured to the rotation shaft 62 with a known set screw 68. The counterweight 65 defines a motor shaft hole (not shown) that is slightly offset from a geometric center (not shown) of the counterweight 65. The offsetting of the motor shaft hole (not shown) generates vibration when the vibration motor 60 spins the counterweight 65. In the preferred embodiment, the motor shaft hole (not shown) is offset from the geometric center (not shown) of the counterweight 65 by a distance of 0.025 of an inch. Although in the preferred embodiment the offset of the motor shaft hole is 0.025 of an inch, it is anticipated that the offset may be as little as 0.015 of an inch, to as much as 0.040 of an inch to generate the desired frequently of vibration to move the pelletized fuel 109. The vibration motor 60 is carried on the bottom portion 23 of the feed plate 20 and is mounted thereto with a motor mount 64, having plural spacedly arrayed arms 64A to more effectively transfer vibration of the spinning counterweight 65 to the feed plate 20. The vibration motor 60 spins at a rate of approximately 3,000 revolutions per minute (RPM) and, combined with the offset counter weight 65 at that RPM produces a sufficiently high frequency vibration adequate to move the pelletized fuel 109 as desired.

Figure 9:
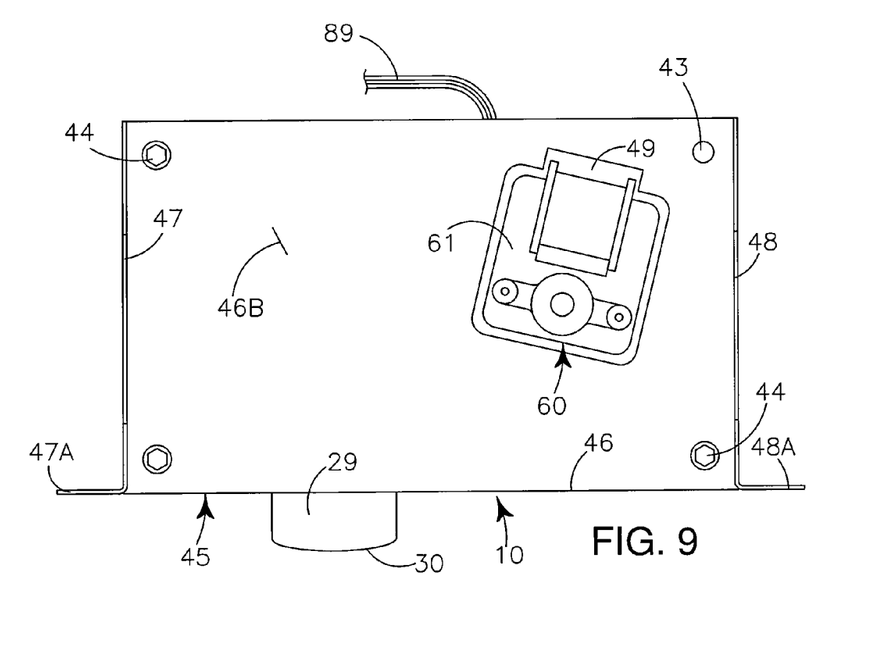
FIG. 9 is a reduced size orthographic bottom, upward looking view of my vibratory feed mechanism.
Figure 10:
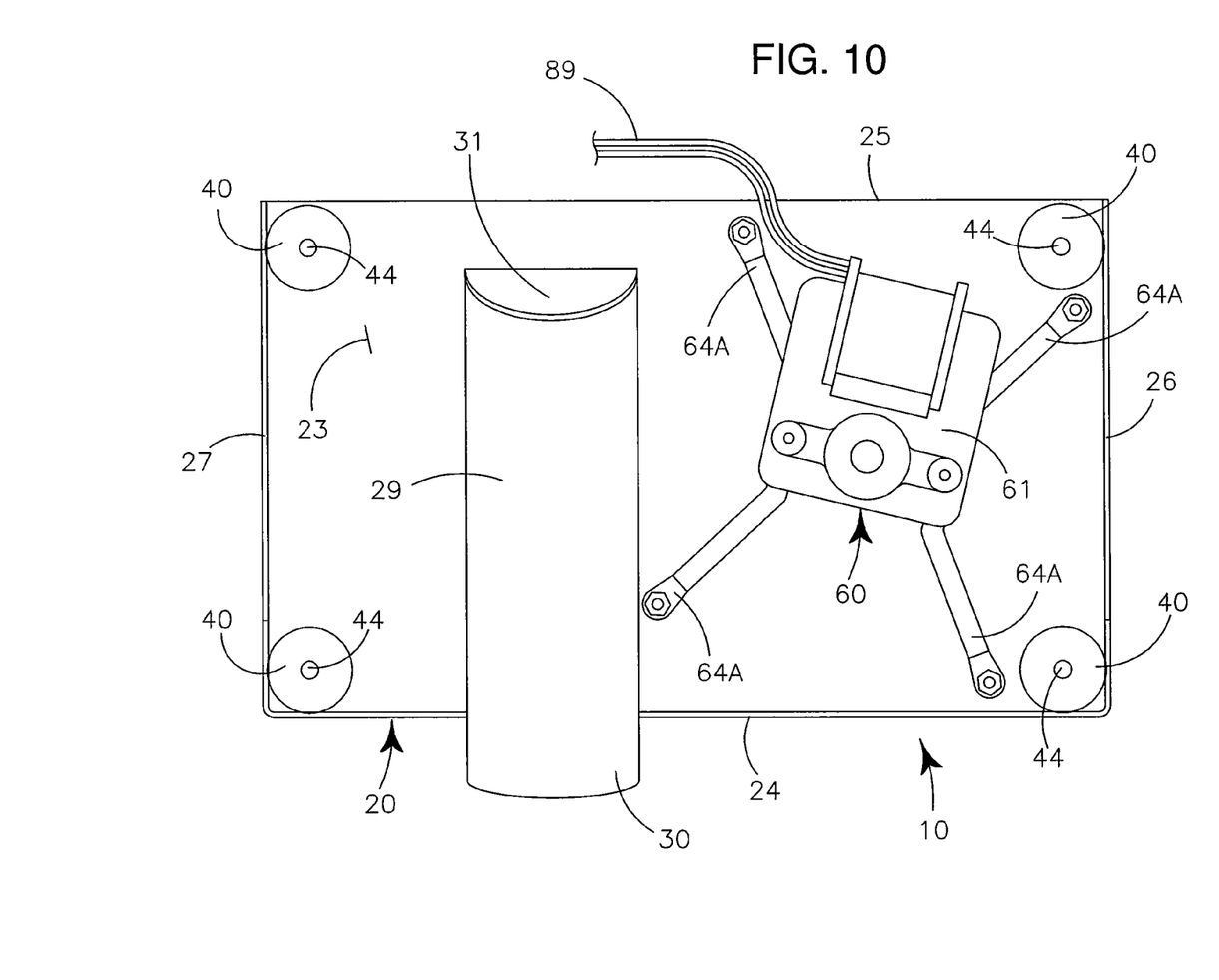
FIG. 10 is an orthographic bottom, upward looking view of my vibratory feed plate with the feed plate support removed, to show the mounting of the vibration motor.

The feed plate support 45 is an inverted "U" shaped structure and has a first vertical leg 47, a second vertical leg 48, and a horizontal shelf 46 extending between the first leg 47, the second leg 48 at upper end portions thereof. The horizontal shelf 46, the first vertical leg 47 and the second vertical leg 48 are all structurally interconnected at adjoining edge portions. The horizontal shelf 46 has a top surface 46A, and an opposing bottom surface 46B. The first leg 47 and the second leg 48 each have a mounting flange 47A, 48A respectively, that extends laterally perpendicularly from each leg 47, 48 in a direction opposite the opposing leg 47, 48 and each of the mounting flanges 47A, 48A define plural spacedly arrayed fastener slots 47B, 48B to carry fasteners (not shown) to fasten the feed plate support 45 and vibratory feed assembly 10 to the pellet fuel stove 100 or pellet fuel barbeque 200. The horizontal shelf 46 further defines a motor access cut out 49 (FIG. 9) which allows operator access to the vibration motor 60 for service, replacement and the like without the need to completely disassemble the vibratory feed assembly 10.

The feed plate 20 is supported upon the feed plate support 45 by springs 37 and spring bushings 40. In the preferred embodiment, a spring bushing 40 is carried at each corner of the feed plate 20 on the bottom portion 23 thereof. Similarly, spring bushings 40 are carried on the top surface 46A of the horizontal shelf 46 approximately at corners thereof. The spring bushings 40 are attached to the feed plate 20, and to the horizontal shelf 46 by means of fasteners 44 extending through fastener holes 43 defined in the feed plate 20 and in the horizontal shelf 46. Springs 37 are preferably coil springs, each having a first end portion 38 and a second end portion 39. The first end portion 38 of each spring 37 communicates with the spring bushings 40 carried on the bottom portion 23 of the feed plate 20, and the second end portion 39 of each spring 37 communicates with the spring bushings 40 carried on the top surface 46A of the horizontal shelf 46. The spring 37 end portions 28, 39 are positionally maintained in engagement with the spring bushings 40 by known fasteners (not shown).

The combustion fan 70 has a motor body 71, a rotating shaft 72 carrying a fan 73 having a plurality of fan blades 74 configured for forcibly moving air and maintaining forced air-flow 116 into the fire pot 105 so that combustion is maintained. Without forced airflow 116 pelletized fuel 109 tends to smolder but does not actively combust to maintain a high heat-generating flame.

Figure 13:
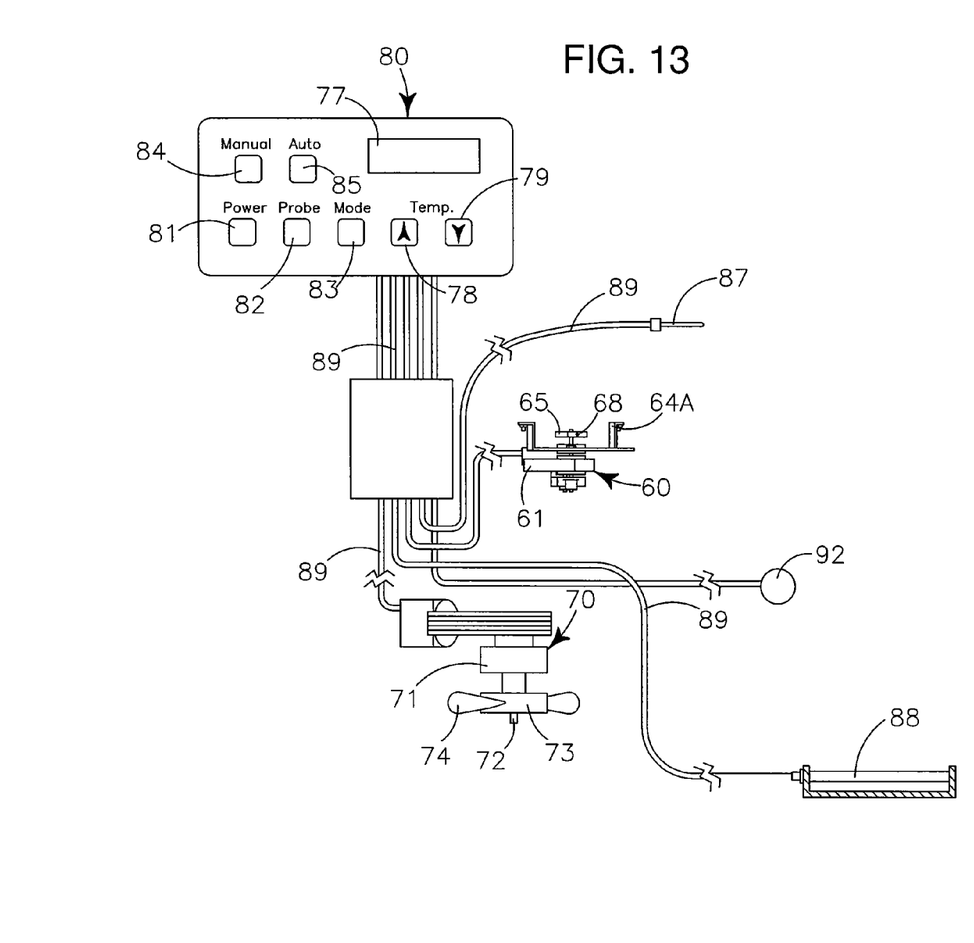
FIG. 13 is an orthographic artist rendition of the control board, the thermo couple, the vibration motor, the igniter and the combustion fan.

Control board 80 controls operation of the vibration motor 60, the combustion fan 70 and other components of the stove 100 or barbeque 200. The control board 80 preferably has plural operator buttons including a power button 81, a probe button 82 to support a meat temperature probe (not shown), a mode input button 83 for setting the operating parameters of the combustion device, such as changing from a barbeque mode (high temperature and little smoke) to a smoker mode (low temperature and lots of smoke), a temperature increase input button 78, a temperature decrease input button 79 and a display screen 77 to display information such as but not limited to, temperature and mode to an operator. Other operator controls (not shown) such as, but not limited to, for example, dials, timers, keypads may also be included on the control board 80.

The control board 80 communicates with the vibration motor 60, the combustion fan motor 70, at least one thermocouple 87 within the interior 104 of the stove 100 to monitor temperature therein, an igniter 88 and also with other known stove components. The control board 80 also communicates with an external power source (not shown), such as household power outlet for electrical power.

As shown in FIG. 12, my vibratory feed assembly 10 is carried vertically below the fuel reservoir 108 with gasket 50 providing a seal between the fuel reservoir bottom 108A and the feed plate 20. Pelletized fuel 109 is carried within the fuel reservoir 108 which has angulated bottom portions that cause the pelletized fuel 109 to move by means of gravity onto the top portion 22 of the feed plate 20. When computer logic (not shown) programmed into the control board 80 determines that heat is required, the control board 80 causes an electrical signal to be communicated through wires 89 to the vibration motor 60 which is activated. Activation of the vibration motor 60 causes rotation shaft 62 to rotate and spin counterweight 65. The spinning of the counterweight 65 causes the vibration motor 60, the interconnected feed plate 20, and the metering channel 29 to vibrate. The vibration responsively causes the pelletized fuel 109 resting upon the top portion 22 of the feed plate 20 to move along the top portion 22 of the feed plate 20 toward the feed opening 33 defined in the feed plate 20. When the pelletized fuel 109 reaches an edge portion of the feed opening 33 the pelletized fuel 109 drops through the feed opening 33 and into the medial channel 32 of the metering channel 29. Because the metering channel 29 is structurally interconnected to the bottom portion 23 of the feed plate 20, the metering channel 29 likewise vibrates due to the spinning counterweight 65. The fuel pellets 109, due to the vibration, and also due to the force of gravity, move from the second end portion 31 of the metering channel 29 to the first end portion 30 of the metering channel 29 to fall outwardly therefrom for passage through the drop tube 36 and into the fire pot 105 for combustion and heat generation.

As needed, according to computer programming within the control board microprocessor (not shown) the control board 80 may also direct electrical energy to the igniter 88 which responsively heats up to a temperature sufficient to cause the pelletized fuel 109 within the fire pot 105 to ignite and combust. The control board 80 also causes the combustion fan motor 70 to activate, which draws air from outside the stove 100 and forces the air 116 through air channels 117 into the fire pot 105 to cause the pelletized fuel 109 to combust and maintain a flame.

As the fuel pellets 109 are combusted, heat is generated which increases the temperature within the stove 100. Increased temperature is sensed by the thermocouple 87 which communicates with the control board 80. When the desired temperature is attained, the control board 80 logic (not shown) causes the vibration motor 60 to stop, which responsively stops the feed of additional pelletized fuel 109 into the fire pot 105.

Depending upon the parameters desired by the operator, and input into the control board 80, the control board logic (not shown) may start and stop the vibration motor 60, the combustion fan 70, and the igniter 88 at various times to maintain a desired temperature and condition.

When my vibratory feed assembly 10 is used with a pellet fuel barbecue 200 (FIG. 11), the structure and operation of the feed assembly 10 is essentially the same, however the programming of the control board 80 is different.

In general, pellet fuel barbecues 200 operate at a variety of temperatures depending upon the particular type of food being cooked upon a grill 204. For instance, when barbecuing some food items, it may be desirable to have high heat which requires the control board 80 to activate the combustion fan motor 70 and the vibration motor 60 at various intervals so that an amount of pelletized fuel 109 is moved from the fuel reservoir 108 and into the fire pot 205 for combustion and heat generation. For other types of foods, for instance brisket, it may be more desirable to have lower heat within the interior 104 of the barbecue 200 and accordingly the control board 80 would activate the vibration motor 60 and the combustion fan motor 70 at greater spaced apart intervals such that the heat generated by combustion of the pelletized fuel 109 is less intense and the temperatures within the barbecue 200 are lower.

A further unique feature of my vibratory feed assembly 10 is that it is capable of operating as a smoker which allows a barbecue 200 to function as a smoker as well. Operation as a smoker may be selected using the user input mode button 83 on the control board 80. When operating as a smoker, the control board 80 will cause the barbeque 200 to operate in a pre-set manual mode that will have larger time intervals between vibration motor 60 activations. The larger time interval spacing of the activation intervals causes less combustion of the pelletized fuel 109 within the burn pot 105 and longer periods of smoldering of the pelletized fuel 109 and thereby generates copious amounts of smoke. The smoldering pelletized fuel pellets 109 generate some heat as well as copious amounts of smoke which is desirable for preparing items such as smoked salmon and smoked jerky which require low temperature but high quantities of smoke.

The vibratory feed assembly 10 will perform according to operator input into the control board 80. When operated as a smoker, the feed assembly 10 will initially generate high heat by depositing a quantity of pelletized fuel 109 into the fire pot 205 and also activating the combustion fan motor 70 for forced air 116. After a desired temperature has been attained, as sensed by the thermocouple 87, the control board 80 may reduce the rate of fuel feed into the fire pot 205, and may control the speed of the combustion fan motor 70, so that the heat within the barbecue 200 causes the pelletized fuel 109 to smolder and generate the desired copious amounts of smoke for the desired cooking effect.

As noted previously, my vibratory feed mechanism maybe used for operation of pellet fuel stove 100, pellet fuel barbecue 200 and a pellet fuel smoker. Computer logic programmed into the control board 80 and the operator settings determine how the vibratory feed mechanism 10 operates and the amount of heat generated by combustion of the pelletized fuel 109.

Having described the structure of my vibratory feed mechanism for pellet fuel combustion devices, its operation may be understood.

For operation of a pellet fuel stove 100, a quantity of pelletized fuel is 109 is placed in the fuel reservoir 108.

Activation of the pellet fuel stove 100 is initiated by an operator's input of desired operating parameters into the control board 80 which is accomplished by the operator pressing a combination of control board 80 buttons 81, 82, 83, 78, 79. The inputted operating parameters are communicated to the control board 80 which uses computer programming to determine how the inputted operating parameters are to be generated, for instance temperature. The computer programming (not shown) contained within the control board 80 communicates a signal to the igniter 88 which responsively heats to a temperature sufficient to ignite the pelletized fuel 109. The control board 80, similarly sends a signal to the combustion fan motor 70 which causes the fan motor 70 to rotate fan 73 to draw air from outside the stove 100 and force the air 116 through air vents 117 proximate the fire pot 105. Similarly, the control board 80 communicates a signal to the vibration motor 60 which causes the vibration motor 60 to activate and spin counterweight 65. The spinning of the counterweight 65 by the vibration motor 60 responsively causes the feed plate 20 to vibrate at a high frequency. The vibration of the feed plate 20 causes pelletized fuel 109 to move along the top portion 22 of the feed plate 20 away from the fuel reservoir 108 toward the metering channel 29. As the pelletized fuel 109 reaches an edge portion of the feed opening 33 the pelletized fuel 109 falls into the medial channel 32 of the metering channel 29. Because the metering channel 29 is structurally attached to the feed plate 20 the pelletized fuel 109 falling into the metering channel 29 moves, as a result of gravity and also a result of the vibration, to the first end portion 30 of the metering channel 29. As the vibration continues, the pelletized fuel 109 falls from the first end portion 30 of the metering channel 29 into the drop tube 36 and thereupon slides along the length of the drop tube 36 and into the fire pot 105 for combustion and generation of heat.

As the pelletized fuel 109 combusts and generates heat, the increasing temperature within the interior 104 of the stove 100, or within the surrounding area such as a room (not shown), is sensed by at least one thermocouple 87, or perhaps by a by a remote wall thermostat (not shown) which generates an electric signal that is communicated to the control board 80. When the desired temperature within the stove 100, or within the surrounding area, such as a room, is attained, the control board 80 will discontinue the signal being communicated to the vibration motor 60, and the feed of additional pelletized fuel 109 into the fire pot 105 is discontinued. As the pelletized fuel 109 is combusted and consumed, the temperature within the stove 100, and within the surrounding area such as a room, may begin to drop as the potential energy within the pelletized fuel 109 is released. As the temperature within the stove 100 or surrounding area drops, the dropping temperature is sensed by the at least one thermocouple 87 (or by a wall thermostat (not shown)) which responsively causes a signal to be sent to the control board 80 which responsively sends another electrical signal to the vibration motor 60 causing the vibration motor 60 to activate and spin the counterweight 65 which vibrates the feed plate 20 and causes additional pelletized fuel 109 to be deposited in the fire pot 105 for additional combustion and additional generation of heat.

The process is repeated in cycles, to maintain the temperature desired by the user as input into the control board 80.

Similar to the operation of the stove 100, if my vibratory feed assembly 10 is installed in a pellet fuel barbecue 200, or pellet fuel smoker (not shown), the operation of the vibratory feed assembly 10 is similar but the cycles and timing by which the vibration motor 60 and the combustion fan motor 70 are activated are modified to provide for the desired temperatures and/or smoke production.

In my preferred embodiment, for operation of a pellet fuel barbeque 200 the operating parameters of the control board 80 are as follows:

The control board 80 is powered on by depressing the power button 81 causing the digital display 77 to illuminate. After powering up, the control board 80 will communicate power to the igniter 88 for a pre-programmed, "timed-on" cycle. The combustion fan 70 is powered on and remains activated until the power is turned off. The vibration motor 60 is activated in a pre-programmed "on-and-off" sequence measured in "seconds on" and "seconds off" to provide pelletized fuel 109 through the vibratory feed system 10 to the burn pot 105 for combustion. The user then selects either a "manual" or "auto" mode to operate the barbeque 200.

MANUAL. The mode button 83 is depressed and held until the manual L.E.D. light 84 on the control board 80 illuminates. The desired barbecue internal cook temperature can now be manually increased or decreased by pressing the temperature up button 78 or temperature down button 79 and holding the selected button 78, 79 until the desired temperature is displayed on the display 77. The temperatures displayed on the display relate to one of a number of preprogrammed feed rates that correspond to various cook temperatures published in a user manual (not shown). In the manual mode, the thermocouple 87 is "locked out" of communication with the control board 80 and therefore is inactive while in the manual mode. The particular uses of the manual mode (among others) is: a) a user will still be able to operate the barbeque 200 or stove 100 should there be a thermocouple 87 failure; and b) the smoke function of the barbecue 200 will perform better on manual due to variations such as outside temperature, wind conditions, etc.

AUTO. To operate in the "auto" function, the mode button 83 is depressed and held until the auto L.E.D. light 85 illuminates. The barbecue 200 will now operate in a mode whereby the temperature button 78 for increased temperature and 79 for decreased temperature are depressed to select a desired cook temperature. The L.E.D main temperature display 77 will show temperatures between 180 and 500 degrees F. of which any temperature in increments of 5 degrees may be selected.

In the "auto" mode, the thermocouple 87 communicates with the control board 80 to report the internal temperature. The control board 80 communicates with the vibration motor 60 and controls the vibration motor's 60 "on" time and "off" time, measured in seconds, to achieve and maintain the selected cook temperature.

In the "auto" mode, the control board 80 will activate the vibration motor 60 in a pre-set "climbing" feed rate until the desired temperature is reached. The control board 80 will then reset the vibration motor 60 sequence to a pre-set "idling" feed rate until the temperature drops 10 degrees below the desired temperature. When such a 10 degree temperature drop occurs as measured by the thermocouple 87, the control board 80 returns to the pre-set "climbing" feed rate and activates the vibration motor 60 accordingly. This sequence continues in a repeating cycle in order to maintain the cook temperature automatically.

The above description of my invention has set out various features, functions, methods and other aspects of my invention. This has been done with regard to the currently preferred embodiments thereof. Time and further development may change the manner in which the various aspects are implemented. Such aspects may further be added to by the language of the claims which are incorporated by reference herein. The scope of protection accorded the invention, as defined by the claims, is not intended to be necessarily limited to the specific sizes, shapes, features or other aspects of the currently preferred embodiment shown and described. The claimed invention may be implemented or embodied in other forms still being within the concepts shown, described and claimed herein. Also included are equivalents of the invention which can be made without departing from the scope or concepts properly protected hereby.

The foregoing description of my invention is necessarily of a detailed nature so that a specific embodiment of a best mode may be set forth as is required, but it is to be understood that various modifications of details, sizes, and rearrangement, substitution and multiplication of the parts may be resorted to without departing from its spirit, essence or scope.

Having thusly described my invention, what I desire to protect by Utility Letters Patent and

What I claim is:

1. A wood pellet fuel feed mechanism for a wood pellet fuel-burning stove comprising:
    a wood pellet fuel burning stove defining an interior volume in which wood pellet fuel is combusted in a firebox to generate useful heat;
    a feed plate communicating with a wood pellet fuel reservoir so that wood pellet fuel is deposited on the feed plate;
    a feed plate support interconnected to the wood pellet fuel burning stove, the feed plate support carrying plural spacedly arrayed springs on an upper surface each spring having a vibration dampening bushing on one end portion, and the feed plate is carried on the plural spacedly arrayed springs to isolate vibration of the feed plate from the wood pellet fuel burning stove to reduce noise of operation;
    a motor communicating with the feed plate for vibrating the feed plate;
    an offset counterweight carried on a rotating shaft of the motor and rotation of the offset counterweight causes vibration of the feed plate; and
    vibration of the feed plate by the motor moves the wood pellet fuel from a first position on the feed plate to a second position on the feed plate for communication of the wood pellet fuel to the firebox of the wood pellet fuel burning stove for combustion in the firebox; and
    a control board communicating with the motor and a power source and a thermocouple, the control board having programming logic for powering on the motor and powering off the motor at pre-set intervals of time so that a predetermined amount of wood pellet fuel is fed into the firebox at timed intervals so that the wood pellet fuel burning stove maintains a pre-set temperature.

2. A wood pellet fuel feed mechanism for a wood pellet fuel burning stove having a wood pellet fuel reservoir and a fire box for combustion of the wood pellet fuel comprising:
    a wood pellet fuel burning stove defining an interior volume in which wood pellet fuel is combusted in a fire box to generate useful heat;
    a feed plate support interconnected to the wood pellet fuel burning stove spacedly below the wood pellet fuel reservoir, the feed plate support carrying plural spacedly arrayed springs on an upper surface, each spring having a bushing on one end portion;
    a feed plate supported on the plural spacedly arrayed springs and bushings of the feed plate support, the feed plate communicating with the wood pellet fuel reservoir so that wood pellet fuel from the wood pellet fuel reservoir is deposited at a first position on an upper surface of the feed plate;
    a feed opening defined in the feed plate spaced apart from the first position where wood pellet fuel is deposited on the feed plate, the feed opening communicating with a sloped metering channel carried on a bottom portion of the feed plate;
    a motor communicating with the feed plate, the motor having
        a rotating shaft carrying an offset counterweight wherein rotation of the offset counterweight by the rotating shaft causes vibration that is communicated to the feed plate and the vibration of the feed plate moves the wood pellet fuel from the first position on the feed plate to the feed opening defined in the feed plate for communication of the wood pellet fuel to the metering channel and through a drop tube to the fire box of the wood pellet fuel burning stove; and
    a control board communicating with the motor and a power source, the control board having programming logic for powering on the motor and powering off the motor at pre-set intervals of time so that the wood pellet fuel burning stove is fed a predetermined amount of wood pellet fuel at spaced apart intervals to maintain a pre-set temperature.

* * * * *